June 14, 1927.
C. L. JOHNSON
1,632,656
TRANSMISSION HOUSING COVER LOCKING MEANS
Filed Sept. 5, 1925
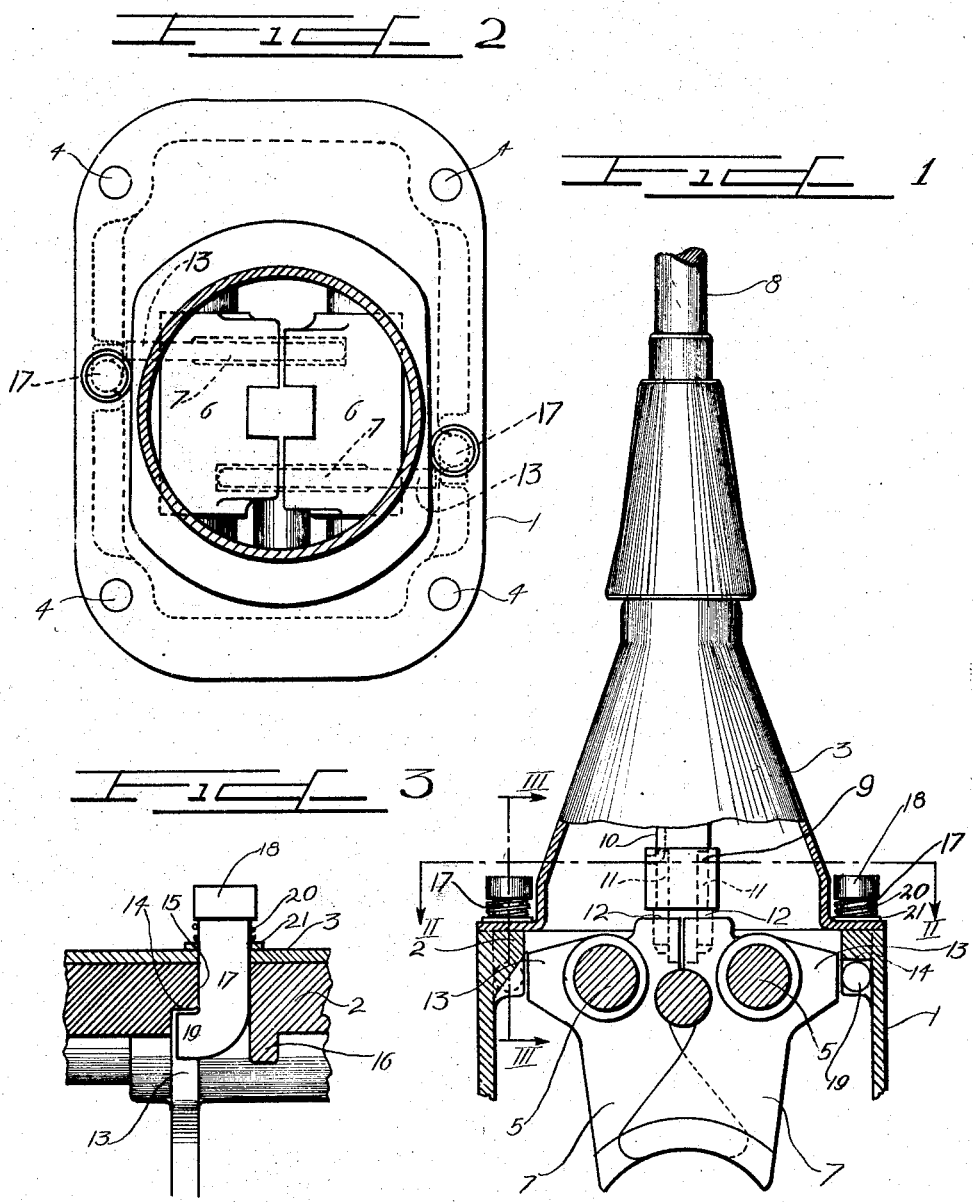
Inventor
Colvin L. Johnson
by Charles Bills
Attys Patented June 14, 1927.

1,632,656

UNITED STATES PATENT OFFICE.

COLVIN L. JOHNSON, OF ST. LOUIS, MISSOURI, ASSIGNOR TO JOHNSON AUTOMOBILE LOCK CO., OF ST. LOUIS, MISSOURI, A CORPORATION OF ILLINOIS.

TRANSMISSION-HOUSING-COVER LOCKING MEANS.

Application filed September 5, 1925. Serial No. 54,727.

This invention relates to means for preventing the removal of transmission housing covers except when the transmission gears are in a predetermined position. It is customary in order to prevent theft or unauthorized use of automobiles and other gear operated mechanisms to lock the transmission gears thereof in a predetermined position by a suitable locking means. While such means are highly successful in accomplishing their purpose, it is nevertheless possible in certain cases to remove the transmission housing cover and the gear locking means after which the gears may be shifted from the predetermined position as desired and the mechanism driven.

It is accordingly an object of the present invention to provide a locking means for transmission housing covers which may only be released by shifting the transmission gears from a predetermined position.

It is also an important object of this invention to provide a locking means associated with a transmission housing and the cover thereof, said locking means being effective to prevent either lateral or vertical movement of the cover relative to the housing except when removed, the removal thereof being permitted only when the gears in said housing are shifted from inoperative position. It is also a very important object of this invention to provide a transmission cover locking means which may be released only when the gears are shifted from inoperative position and which may be simply and easily actuated to permit removal of said cover when said gears are so shifted.

Other and further important objects of this invention will be apparent from the disclosures in the specification and the accompanying drawings.

This invention (in a preferred form) is illustrated in the drawings and hereinafter more fully described.

On the drawings:

Figure 1 is a fragmentary transverse section with parts removed showing an embodiment of the cover locking means of this invention.

Figure 2 is a horizontal section with parts removed taken at the line II—II of Figure 1.

Figure 3 is an enlarged fragmentary detail vertical section with parts omitted taken on the line III—III of Figure 1.

As shown on the drawings:

Reference numeral 1 indicates a transmission housing which is provided at its upper edge with an inwardly extending integral flange 2 to which the transmission housing cover 3 is secured by means of machine screws which fit into threaded recesses 4 extending vertically into the flange 2. The transmission housing 3 is provided with a flange portion which rests on the flange 2 and which is apertured to receive the machine screws. The cover 3 is also provided with a central upwardly extending dome portion which affords a universal support for a gear shift lever 8, the latter having a depending portion extending downwardly through the interior of the dome portion into the housing or casing. Mounted in the casing 1 and extending longitudinally thereof are parallel rods 5 which have blocks 6 slidably mounted thereon. The adjacent faces of said blocks 6 have notches or recesses formed therein adapted to receive the lower end of the depending portion of the gear shift lever 8 and depending from said blocks and integral therewith are gear shifting forks 7 which engage transmission gears (not shown) in the casing to shift said gears to a plurality of predetermined positions. When the blocks 6 are in the position shown in Figure 2 with their adjacent faces opposite each other, the gears are in neutral or inoperative position. A key operated locking means (not shown) is mounted in a suitable position relative to the gear shift lever 8. A collar 9 is provided surrounding the depending portion of the lever 8 and is adapted to be raised or lowered by the key operated locking means by means of a vertical rod 10 connected therebetween. The depending portion of the lever 8 is provided with a pair of vertical grooves 11 in which are vertically slidable a pair of depending locking lugs 12 secured to the collar 9. When the collar 9 is actuated to lowered position by the key operated means, the lugs 12 are adapted to enter their respective recesses in the adjacent faces of the blocks 6 for holding the lever 8 securely in neutral or inoperative central position. When the collar 9 is raised by the key operated means, the lugs 12 will leave the aforementioned recesses to release the lever 8 so that the same may be actuated to shift the blocks 6 to any desired operative position. Oppositely extending projections 13 are formed integral with the forks 7 which are arranged to selectively position the projections adjacent the flanges 2 to confront a recess 14 formed therein. The recesses 14 communicate with a vertically extending slot 15 which is adapted to receive a bolt 17 to be hereinafter described. Each slot 15 on the side opposite the recess 14 is provided with a depending lug 16. The flange portion of the cover 3 is apertured above the slots 15 to receive therethrough bolts 17 which extend into said slots. Each bolt 17 is provided with a knurled or other suitable head 18 at its upper end and a hook portion 19 at its lower end. Surrounding each bolt 17 beneath the head 18 thereof is a helical compression spring 20 which engages beneath said head and abuts a washer 21 also surrounding said bolt and resting on the flange portion of the cover 3. The bolt 17 is adapted to enter the slot 15 when the cover 3 is placed on the flange 2, the hook portion 19 while entering extending inwardly. Each bolt 17 may after the cover 3 is positioned on the flange 2, be turned about its axis to cause the hook portion 19 to enter the recess 14 for preventing subsequent removal of the cover 3 until said bolt has been again turned to bring said hook portion 19 out of said recess. It will be seen, however, that since the projections 13 extend to adjacent the recess 14, they will prevent such turning of the bolt 17 to remove the hook portion 19 thereon from the recess 14 until said projections 13 have been shifted from neutral or inoperative position by reason of shifting the block 6. But the block 6 cannot be shifted while the collar 9 is in lowered position by reason of the key operated locking means. The function of the depending lug 16 is to prevent accidental or inadvertent engagement of the hook portion 19 under the side of the slot 15 opposite to the recess 14. It will be apparent that this invention provides simple and efficient means for preventing the removal of the transmission housing cover except when the gears in the housing are shifted from neutral or inoperative position and that when said gears are locked in said position, said cover will also be locked.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. The combination with a casing of gears mounted therein, means for shifting said gears, removable means on the casing to permit access to the gears when removed, a spring pressed bolt member associated with said removable means and adapted to be actuated when in position to prevent the removal of said removable means, and means associated with said shifting means for holding said bolt in actuated position for preventing the removal of said removable means except when the gears are shifted.

2. The combination of a transmission cover and casing, said casing having a slot beneath said cover, a rotatable member freely extendible through said cover into said slot adapted to engage said casing in a rotated position, gear shifting means within said casing and means associated therewith for holding said rotatable member in engaging position except when said gear shifting means is shifted.

3. The combination with a transmission housing cover and casing, of gear shifting means in said casing, laterally projecting means on said gear shifting means, said casing having a recess positioned opposite to said projecting means when said gear shifting means is in a predetermined position, and a member movable from without for movement in and out of said recess for locking and unlocking said cover to said casing, said projecting means acting to prevent movement of said member out of said recess.

4. The combination with a casing and removable cover therefor, of gears mounted in said casing, means shiftable from a predetermined position for shifting said gears, retaining means comprising a hook member rotatable from without said casing and extending therein for engagement and disengagement with said housing, and means associated with said shifting means for preventing rotation of said member except when said gears are shifted from said predetermined position.

5. The combination with a transmission housing cover and casing, of gear shifting means in said casing, laterally projecting means on said gear shifting means, said casing having a shoulder beneath said cover positioned opposite said projecting means when said gear shifting means is in a predetermined position, and a member movable from without for engagement and disengagement with said shoulder for locking and unlocking said cover to said casing, said projecting means acting to prevent disengagement of said member with said shoulder.

In testimony whereof I have hereunto subscribed my name.

COLVIN L. JOHNSON.